US006254239B1

(12) United States Patent
Hibner, II et al.

(10) Patent No.: US 6,254,239 B1
(45) Date of Patent: Jul. 3, 2001

(54) METHOD AND SYSTEM FOR IMAGE VISUALIZATION

(75) Inventors: Rodney C. Hibner, II, Collin; Mervin L Gangstead, Dallas, both of TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/364,851

(22) Filed: Jul. 30, 1999

(51) Int. Cl.$^7$ .................................................... G03B 21/26
(52) U.S. Cl. ................................ 353/94; 353/121; 353/69
(58) Field of Search ................................ 353/94, 30, 121, 353/69, 70; 352/69, 70, 133; 348/750, 751, 840

(56) References Cited

U.S. PATENT DOCUMENTS

| | | | |
|---|---|---|---|
| 3,602,582 | * 8/1971 | Torricelli | 352/41 |
| 4,392,187 | * 7/1983 | Bornhorst | 362/233 |
| 4,980,806 | * 12/1990 | Taylor et al. | 362/85 |
| 5,902,030 | * 5/1999 | Blanchard | 353/94 |
| 5,988,817 | * 11/1999 | Mizushima et al. | 353/94 |

OTHER PUBLICATIONS

"Introducing ComView Graphics" article from ComView Graphics—Large scale display systems; Web–Page: http://www.cvgl.com/corporate/about.html; introduced at Infocom Jun. 10–12, 1999; 2 pages.

"The ViewBoard—Highest quality solution for data visualization" article from ComView Graphics; 1 page.

"The ViewBoard—Specifications" article from ComView Graphics; 1 page.

"SYNELEC Lite Master" information/presentation from DLP, A Texas Instruments Technology; including information on the Lite Master DLP Projection Cubes, Unique BlackScreen Technology, and Synelec's Lite Master Projection Cubes entitled The First 'Plug & Play' DLP Video Walls in the World; 4 pages.

"Panoram" information/ presentation from Panoram Technologies, Inc.; website: www.panoramtech.com; © 1999; 2 pages.

"Netmaster Systems EQ4052–S DLP Display Wall Cube" information/presentation from Electrohome Visionary Thinking; Web–Site www.electrohome.com; 2 pages.

"Mirage Vision MV–50DG" article, Gundermann Videowall, Web–Site: www.videowall.de; 2 pages.

"The Maximum System, The High–Definition System for Maximum Display" pamphelt, featuring the ict–SPLITMACHINE and ict–CONTROLMACHINE, by Video Visions; Web–Site www.Video–Visions.com; 4 pages (actually two–folded in half).

(List continued on next page.)

Primary Examiner—William Dowling
(74) Attorney, Agent, or Firm—Baker Botts L.L.P.

(57) ABSTRACT

An apparatus for visualizing image data comprises a first projector (28) and a second projector (29). The first projector (28) is positioned with a first optical axis perpendicular to an image focal plane (40), and projects to the focal plane (40) a first image (A) with a first image area. The second projector (29) is positioned in relative alignment with the first projector (28), with a second optical axis perpendicular to the focal plane (40). The second projector (29) projects to the focal plane (40) a second image (B) with a second image area adjacent to the first image area. A method for visualizing image data comprises projecting to an image focal plane (40) a first image (A) with a first image area, and a second image (B) with a second image area. The first image area is adjusted to be juxtaposed to the second image area.

14 Claims, 5 Drawing Sheets

OTHER PUBLICATIONS

"OverView–MP, Modular Design of a Display Wall Based on Poly–Silicon LCD Rear Projection Technology", Barco, Web–Sites at www.seufert.com and www.barco.com; Mar. 1999; 2 pages.

"Large Venue Vision and Performance, Seleco SDV 52 DataWall Projection System" pamphlet/presentation, Seleco The Americas, Web–site: www.owl–video.com; Apr. 1999; 2 pages.

* cited by examiner

METHOD AND SYSTEM FOR IMAGE VISUALIZATION

TECHNICAL FIELD OF THE INVENTION

This invention relates in general to the field of image projection and processing and more particularly, the invention relates to a method and system for image visualization.

BACKGROUND OF THE INVENTION

In conventional image projection systems, there is generally a single projector projecting a single image. Such an image may be projected forward or backward, according to the type of projector used.

It is known to use the concept of a "video wall" to project multiple images, or to project portions of a single image arranged to simulate the look and feel of a larger image. For example, nine televisions (video displays) are disposed within a single wall in a three-by-three matrix. Each television displays the same image, or displays one-ninth of a scene. The effect of the latter is that the scene appears to be the dimension of the nine television displays, although interrupted by the spacing between each television. Other approaches project multiple images on a wall, and by overlapping and performing image processing on the images such as averaging, to give the appearance of continuity. Other multiple image displays simply leave gaps of about a quarter inch between the neighboring images.

Multiple image displays may be required in cases typically encountered in image processing, where datasets are too large to display using one video display. For example, a physician or analyst may need to view a large dataset that exceeds hardware framing limitations. When examining such a large dataset across multiple image displays, the physician or analyst typically encounters problems in examining the importance of the data in the mullions between neighboring images. In this scenario, the analyst requires additional contextual cues in displaying multiple images to adequately infer, deduce or conclude, including the ability to view such data seamlessly from one image to the next.

In systems such as information visualization and management, where seamlessness between multiple images provides significant advantages, a problem arises when the need to access information in adjacent images is disrupted by a mullion in the information such as averaged or missing data between the images. These circumstances exist when there is an image overlap, or even a black gap. Thus, when a user of the image displaying data needs to move between these images, his/her ability to integrate, infer, deduce, and conclude is disrupted by such interruptions between images.

SUMMARY OF THE INVENTION

Therefore, a need has arisen for a method and system for image visualization that overcomes the disadvantages and deficiencies of the prior art.

In accordance with the present invention, an apparatus for visualizing image data comprises a first projector and a second projector. The first projector is positioned with a first optical axis generally perpendicular to an image focal plane, and projects to the focal plane a first image with a first image area. The second projector is positioned in relative alignment with the first projector, with a second optical axis generally perpendicular to the focal plane. The second projector projects to the focal plane a second image with a second image area adjacent to the first image area.

Further in accordance with the present invention, the method for visualizing image data comprises: projecting to an image focal plane a first image with a first image area, projecting to the focal plane a second image with a second image area, and aligning the first image area to be juxtaposed to the second image area.

One technical advantage of the present invention is in applications where users require or desire multiple image displays, where contextual information is available to adequately infer, deduce, or analyze. Another technical advantage of the invention is that image overlaps are not altered between neighboring images. Another technical advantage of the invention is the use of standard projectors, computers, video displays and image processing algorithms.

BRIEF DESCRIPTION OF THE DRAWINGS

For a better understanding of the present invention, reference may be made to the accompanying drawings, wherein.

DETAILED DESCRIPTION OF THE INVENTION

Figure 1:
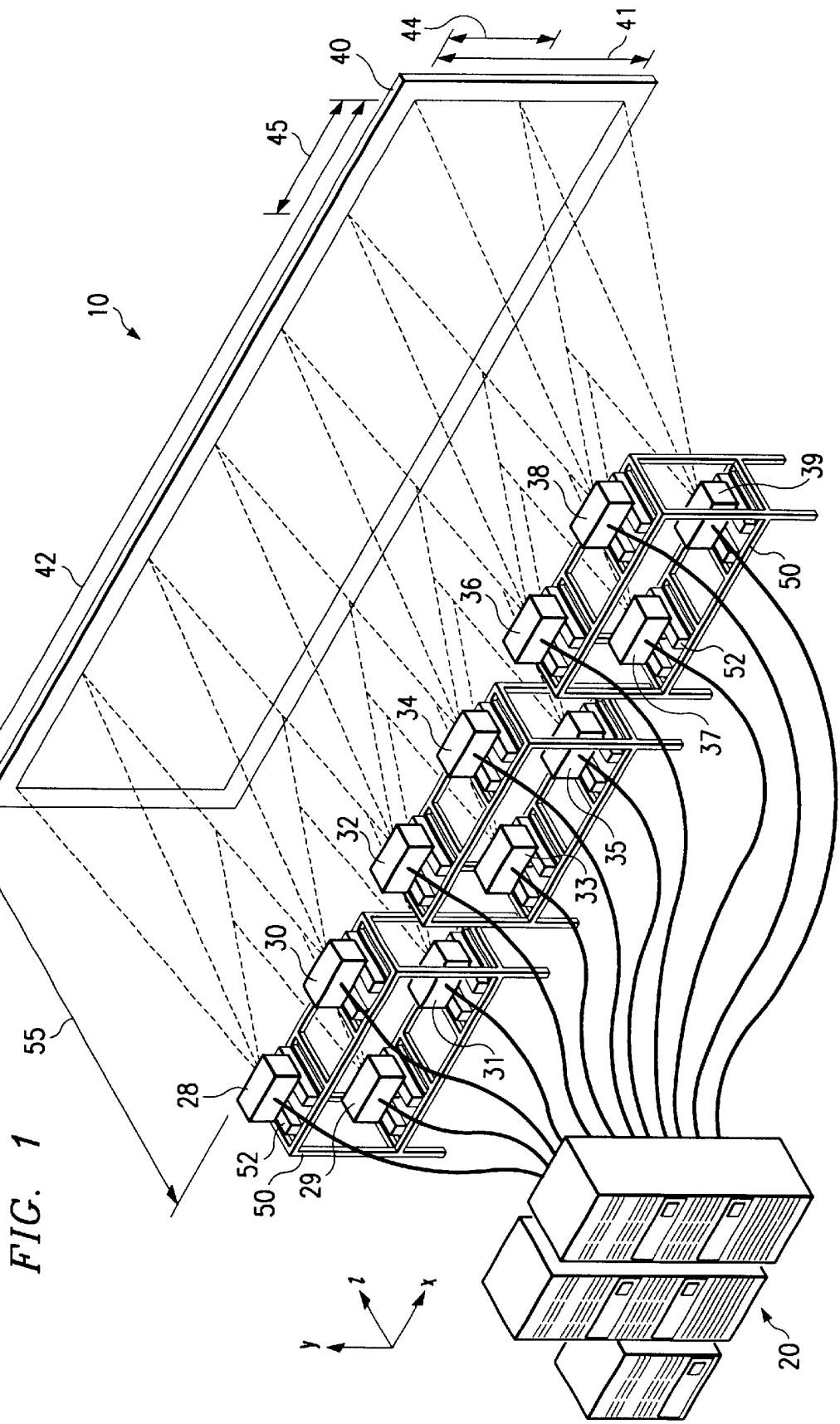
FIG. 1 is a system level diagram of an embodiment of an image visualization system according to the teachings of the present invention.

Referring to FIG. 1, there is shown a system diagram of an embodiment of an image visualization system 10 according to the present invention. A plurality of projectors 28 to 39 supported by racks 50 projects a plurality of images A–L (see FIG. 2) to screen 40. The projectors 28–39 are coupled to computer 20.

Twelve generally non-scanning projectors each project an image of 1280×1024 pixels. Each image is focused to a focal plane generally corresponding to a location of screen 40 having dimensions length 42 by height 41 suitable to display images A–L projected by projectors 28–39. An image projected by each projector generally has dimensions of length 45 by height 44 on screen 40. Each image projected by projectors 28–39 is adjacent to the next image so that the images A–L are substantially seamless as displayed on screen 40. The placement and details for such images will be discussed in further detail in conjunction with FIG. 2.

Non-scanning projectors 28–39 are particularly advantageous for their ability to generate images in physically stable positions. This type of projector typically includes a lens with a flat field, low distortion and good symmetry. Such lenses are mechanically stable and precisely adjustable, and yield reproducible results. A typical projector includes micro mirror or liquid crystal display (LCD) projectors. One such projector is Texas Instrument's Digital Micro Mirror Device™ (DMD). Other suitable projectors, such as optically scanning projectors, may also be suitable to use in system 10.

Projectors 28–39 typically display any information input to each projector, such as text, graphics and video. The video may be analog or digital. For example, the DMD provides 8–10 bits per color of gray scale, which gives 256 different shades of each of the primary colors thereby allowing for roughly 16.7 million different color combinations to be created digitally.

Projectors 28–39 are configured to form an array of 2×6 images A–L. Any suitable configuration of M×N may be used, where M denotes the number of rows and N denotes the number of columns of images. For example, it may be advantageous to have a linear array of 1×N images, or a square array of M×N images, where M=N.

Each image projected by projectors 28–39 comprises a plurality of pixels. For example, each 1280×1024 pixel image A–L comprises 1024 lines and 1280 rows of pixels. Images A–L are generally rectangular, each with a defined image area. Any suitable image size may be used. To increase resolution, more pixels per inch may be used. Such a configuration is provided by resealing, for example, by including more projectors and changing the image magnification of each projector, or by including more mirrors in each DMD projector.

To increase the precision of positioning projectors 28–39 relative to screen 40, the plurality of projectors 28–39 is supported by a plurality, i.e. three, racks 50 and rails 52. Each projector 28–39 is supported by a pair of rails 52 to enable the projector to slide towards and away from screen 40. Racks 50 and rails 52 are each made from a generally rigid material, for example, aluminum. Such a material is advantageous to use for its stability, strength, and vibration dampening properties. Other suitable materials may also be used. It is also within the scope of the invention to use other suitable configurations for supporting and positioning projectors 28–39.

Screen 40 is generally located in an x-y plane at distance 55 (in the z direction) of about ten feet from the screen of projectors 28–39. At a distance 55 of about ten feet, the plurality of images A–L comprise an array measuring from end to end of roughly 54 inches as projected on screen 40. At distance 55 of about ten feet, pixel sizes on the screen 40 are generally 0.030 inch, corresponding to generally to 30 pixels per inch. This distance is particularly advantageous for viewing images A–L at, for example, arm's length. The projection distance 55 may be varied according to user needs, and generally varies with a user's distance from screen 40. For example, for larger images (and thus larger pixel sizes), the projection distance 55 could be increased. In this respect, a user's eyes can integrate over film flicker speeds appropriately-sized pixels and luminance into continuous image data.

In addition to the geometrical relationship between projectors 28–39, screen 40 and a user, screen 40 is selected from a material such as DaLite Dual Vision to provide the lowest, yet most uniform gain achievable across length 42. The gain and uniformity are inversely related and thus are traded-off with the needs of system 10. Screen 40 having these gain and uniformity properties is advantageous in alleviating the discontinuities in illumination across the field of images A–L caused by stray light illuminated outside a projection area. Typically, the luminance of each pixel varies with the user's position with respect to scattered and direct incident light from each individual projectors 28–39. Screen 40 with these gain and uniformity properties uniformly distributes the gain and luminance of images A–L to a user viewing any portion of images A–L on screen 40. Similar properties may also be provided by, for example, precisely-configured individual baffles or Fresnel lenses for each projector.

A display configuration generally includes balancing the gain of screen 40 with the projection distance 55, and proper alignment and tooling to minimize artifacts for the boundaries of such lenses. A screen 40 as described is also particularly advantageous for the property to remain generally flat, or perpendicular relative to the optical axis of each projector 28–39.

Computer 20 is a suitable platform that performs any image or data processing typically used in system 10. Computer 20 provides input video, image, or graphics data for projectors 28–39. In one embodiment of the invention, the computer 20 is a Silicon Graphics Incorporated (SGI) ONYX II with four video graphic pipes. Computer 20 may be any other suitable platform with software and data storage to provide image processing applications dictated by the needs of system 10 users.

In operation, system 10 has utility for a variety of needs. For example, system 10 may be used to project or tile displays for a large viewing audience. Also, the system 10 may be used for decision-making applications, typically including general electronic light table functions, sequencing of images, and registration of images to reference data, etc. Typical decision-making includes inference and deduction, requiring resolution and accuracy that only near seamless, multi-image presentation provides. For example, users may wish to display and register large maps or graphics to large data sets that span the capacity of several projectors for inference and deduction.

Color, black and white, analog or digital images may be projected by the system 10. System 10 may also display stereo data. Such data may be viewed, for example, in anaglyph form with any suitable red-green glasses. Typically, projection of such images includes at least 8 bits of resolution per pixel. For a color image, each pixel requires 8 bits per color, or 24 bits of resolution per pixel. Pixel depth is limited only by projector optics. Thus, projection and processing of a large array of images A–L generate large amounts of image data to be processed for decision making capabilities that include integrating the data with other referenced data, e.g., maps, reference points, graphics, and the like.

Alignment and operation of projectors 28–39 and screen 40 properly places images A–L in focus for users of the system 10. Many computer platforms 20 typically provide the functionality for decision-making applications dictated by the needs of users. For example, video cards regularly tile video displays so that a mouse may move from one image to another. SGI's Onyx II provides very fast processing and frame refreshing, and will automatically stack and tile images A–L in a desired orientation. For electronic light table functions, a computer such as the Onyx II provides contiguous virtual "fly-through" of images A–L. Separate video processing may be used to enhance processing speeds as desired.

Figure 2:
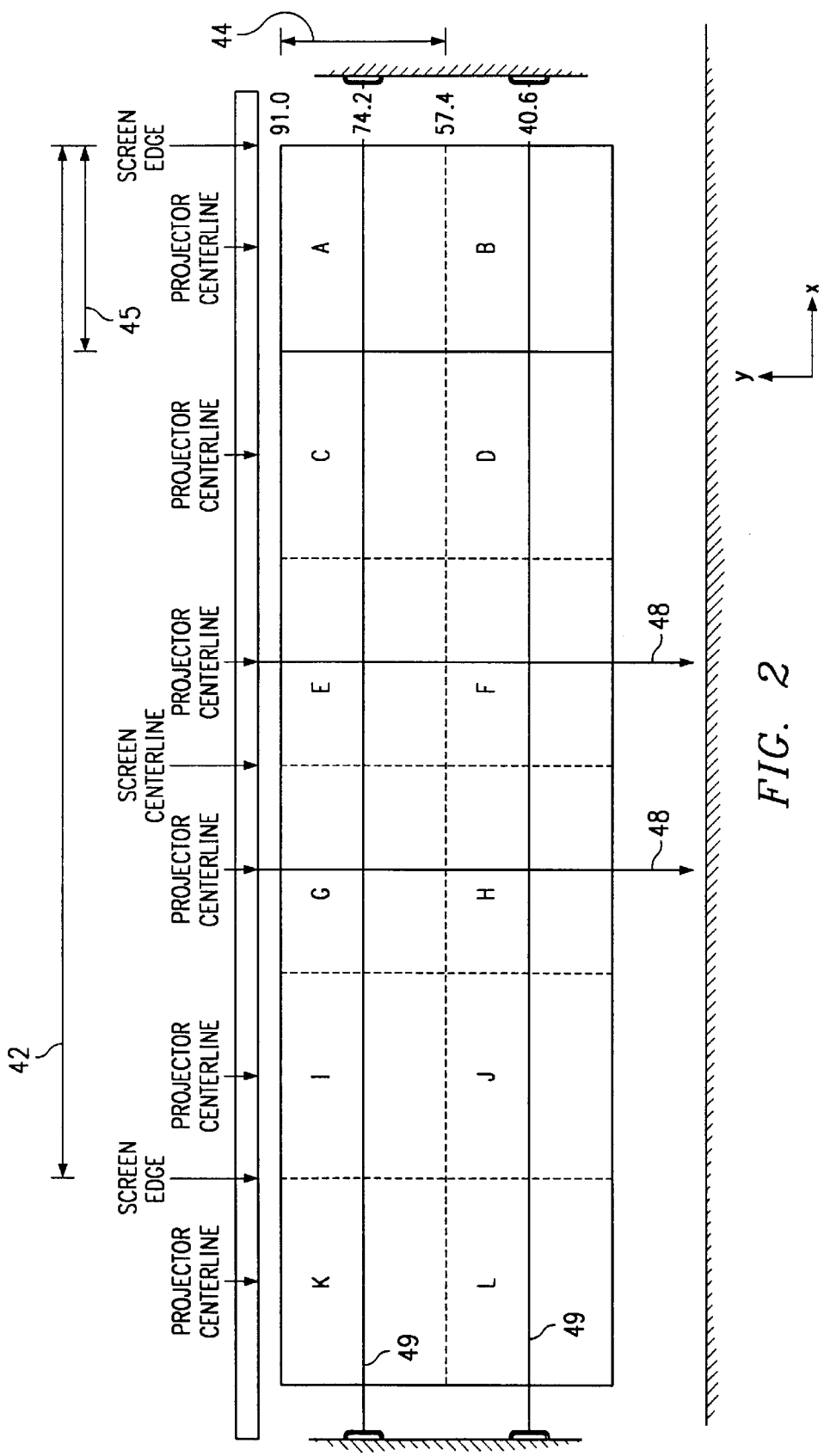
FIG. 2 is a diagram of one embodiment for image placement in a focal plane.

Referring now to FIG. 2, there is shown a diagram of one embodiment for image placement in a focal plane according to the teachings of the present invention. Images A–L are shown as projected in the focal plane co-located in screen 40. Each image A–L has dimensions length 45 and height 44 and is generally centered at the optical axis of each projector 28–39. Each image is to be located such that one edge is juxtaposed to an edge of its nearest neighbor. Such adjacency is near seamless. For example, the top row of image B begins where the next row of pixels after the last row of pixels displayed at the bottom of image A should lie. Similarly, the right edge of image C begins where the next column of pixels after the last column of pixels displayed at the left edge of image A should lie, and so on. It is particularly advantageous for such placement to be accurate within a fraction of a pixel, e.g., one-quarter pixel or, in some cases, to within an acceptable tolerance over which human eyes may integrate.

Screen 40 may be supported in a generally flat position by a rigid frame (not explicitly shown) Any suitable means for retaining a generally flat shape relative to the optical axes of projectors 28–39 for screen 40 may be used. The screen shape should be retained within the accuracy of seamlessness desired, e.g. one-quarter pixel.

A series of alignment lines 49 are stretched in front of screen 40 as shown in order to align image placement in screen 40. Thus, alignment lines 49 establish each center line for images A–L. As can be seen from FIG. 2, centering lines 48 are suspended over the nominal centerlines of the projected images. Such alignment lines and centering lines are useful in establishing the relative alignment of projectors 28–39, and may be removed after projector alignment is performed, as discussed in conjunction with FIG. 3.

Although screen 40 is shown in a generally straight configuration, it is also within the scope of the invention for screen 40 to be generally curved either convex or concave relative to the plurality of projectors 28–39 as shown in FIG. 1.

Figure 3:
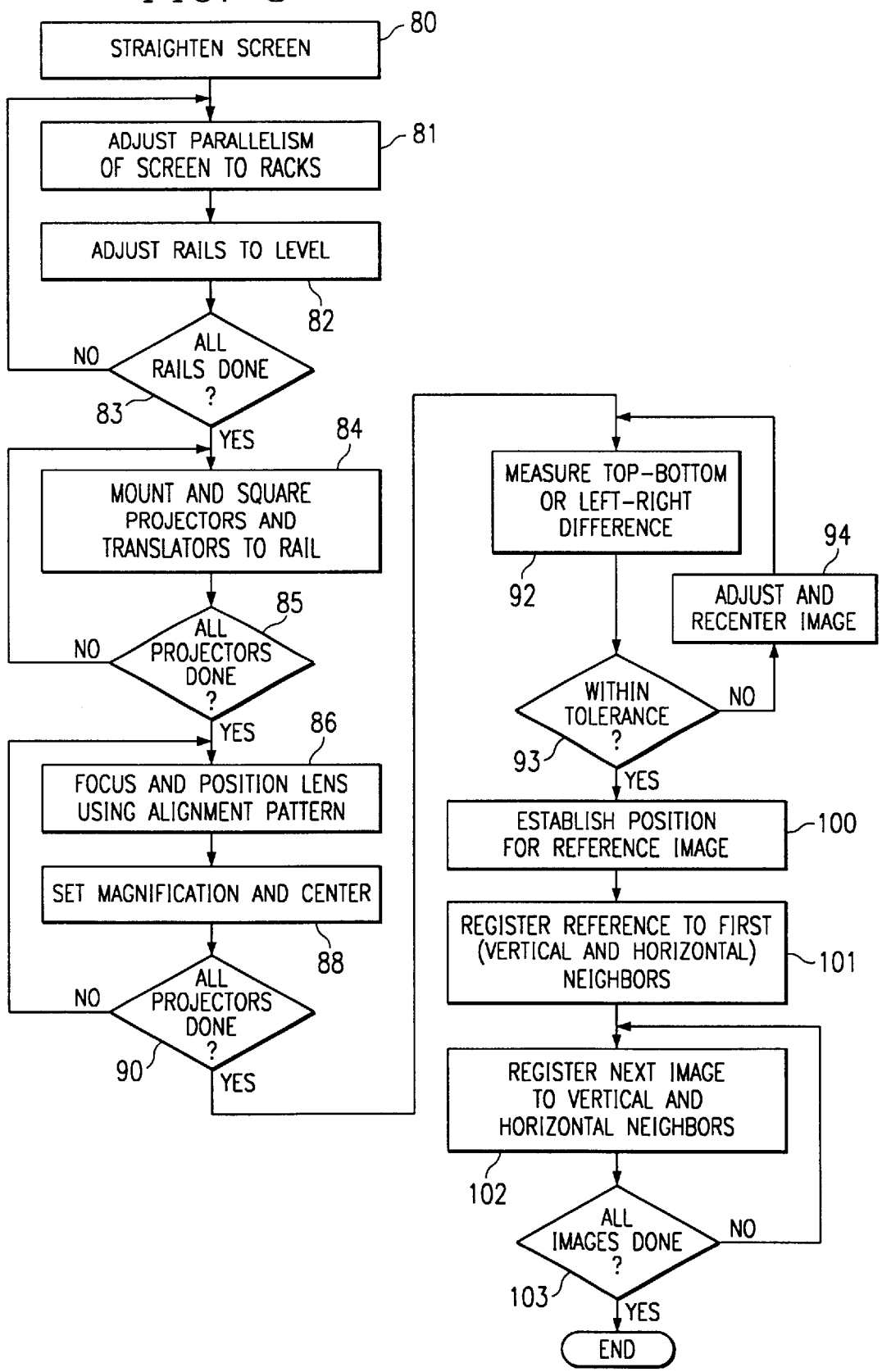
FIG. 3 is a flow chart describing an alignment procedure for an image visualization system as shown in FIG. 1.

FIG. 3 is a flowchart describing an alignment procedure for an image visualization system using the teachings of the present invention. Alignment generally comprises two phases, and may be accomplished with or without the use of a computer. Alignment may also comprise predetermined measurements, or dynamic adjustments as required by system 10. The first or coarse alignment phase establishes locations for each of the projectors relative to screen 40. The second or fine alignment phase adjusts pixel locations in each image so that the plurality of images A–L are adjacent to one another. Both phases of alignment are performed for initially installing system 10, and the latter phase may be performed to correct any drift of the components.

The method used for alignment illustrated in FIG. 3 comprises generally steps for positioning of projectors 28–39 relative to screen 40, establishing image positions for each projector, image magnification, image centering, and correction of keystoning effects. Steps 100–103 describe the method for fine alignment, which includes registering adjacent images to one another so that each pixel on each image edge is nearly adjacent to the next pixel on the next image edge. Such a method aligns the plurality of projectors 28–39 in relative alignment with respect to screen 40, to adjust for individual optical and mechanical imperfections of each projector.

Coarse alignment begins at step 80, and includes straightening screen 40 to present a nearly flat display. Screen 40 may be mounted in brackets, and alignment lines 49 are stretched across the area of the screen 40 as discussed and shown in FIG. 2. Two centering lines 48, as illustrated in FIG. 2, are hung in front of screen 40. In order to maintain adjacency of images A–L, it is advantageous for screen 40 to be generally perpendicular to the optical axis of each projector 28–39. Thus, screen 40 is flat, within the same accuracy desired by users of system 10. For image adjacency accuracy of one quarter pixel, such accuracy equals approximately ¼×0.030 inches.

In step 81, the parallelism of racks 50 to screen 40 is adjusted. Mean distance is used for all four edges of screen 40 to establish distance, tilt, and parallelism of the racks 50 to screen 40. In step 82, the rails 52 for a projector are leveled using a surveyors telescopic sight. Horizontal and vertical distances to a screen center section are measured and averaged. The position and tilt of rails 52 are then adjusted in step 82 until level within acceptable limits. Such limits are predetermined to achieve a desired accuracy at a specific distance 55. Step 83 then returns the process to repeat step 82 for the rails 52 for each projector 28–39.

Figure 5:
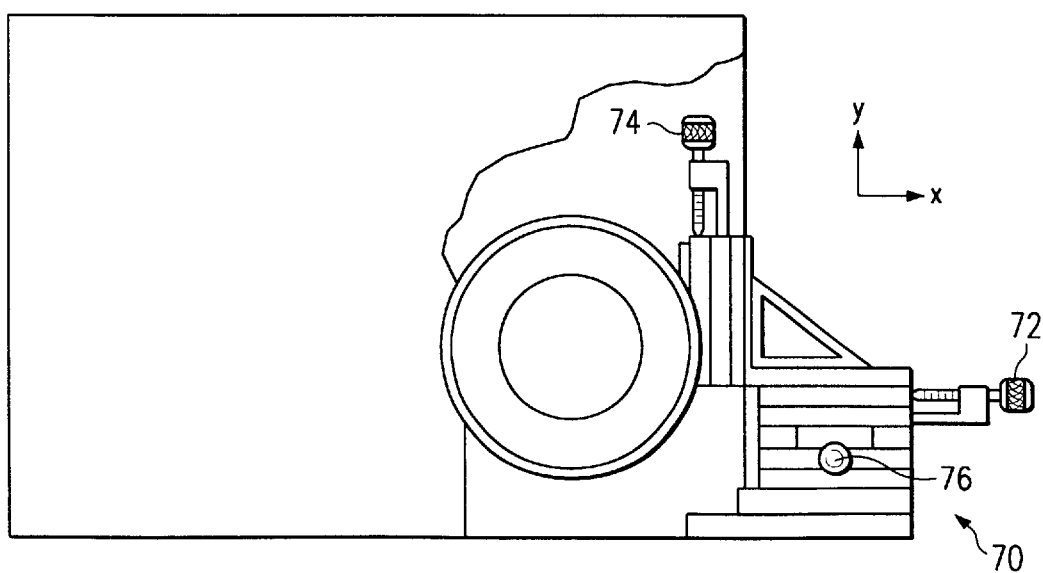
FIG. 5 is a schematic diagram of an alignment control according the present invention.

In step 84, a projector is centered on its corresponding rails 52 and a translator 70 as shown in FIG. 5. Step 85 returns the process to step 84 for each of the projectors 28–39.

Figure 6:
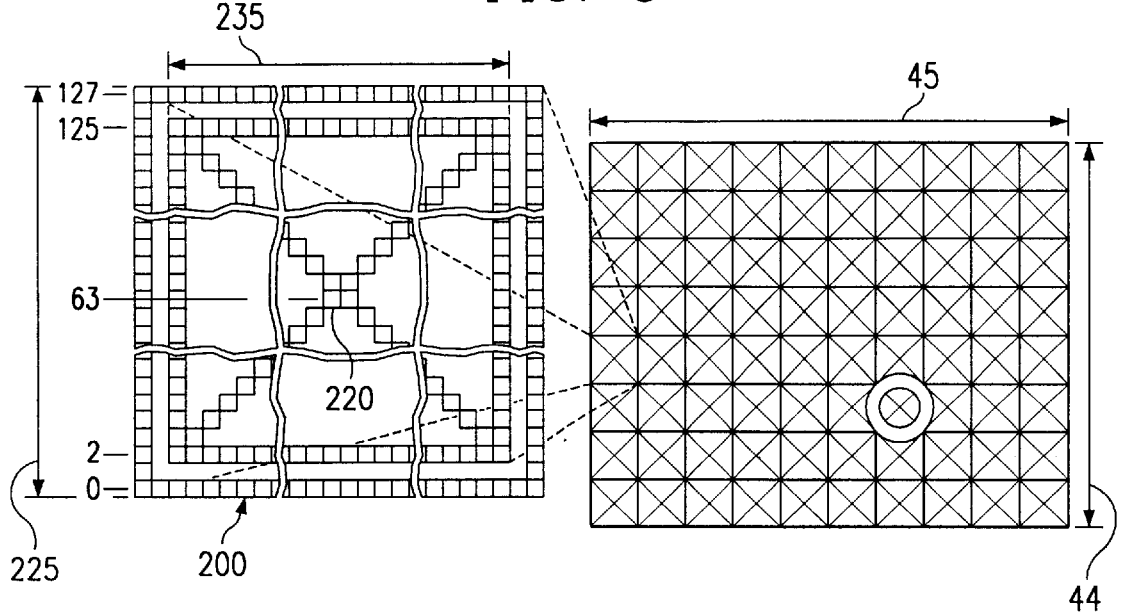
FIG. 6 is an alignment pattern for an image visualization system as shown in FIG. 1.

In step 86, a projector is focused to establish an alignment pattern shown and discussed in FIG. 6. An alignment pattern as described insures that the basic image block 200 is replicated throughout the corresponding image; that is, across all lines and columns of images A–L to establish adjacency of images A–L. Many mechanisms for alignment and alignment patterns are known to those skilled in the art. In step 86, the lens of a projector is translated using its translator 70 in the x and y directions (see FIG. 5) to align the centerline of a projected image with the respective centering lines 48 and 49. Details of translator 70 are discussed in conjunction with FIG. 5.

In step 88, magnification of a projector is set by first measuring dimensions of the projected image. Such measurement may be taken between the center of the leftmost pixel at the mid-height of the projected image on screen 40 to the center of the right-most pixel. A projector is then moved, refocused and recentered until the measured width of the respective image area is appropriate. Such measured width is predetermined and is for example 41.97 inches, to achieve 0.030" pixel dimensions for each image. A measured width is selected to generally accommodate for lens imperfections, as is discussed in conjunction with FIG. 4.

Next, a projector is centered relative to the respective projected image on screen 40 by using an alignment telescope (not shown) mounted to the rails 52. By using the alignment pattern as shown and discussed in FIG. 6, measurements are taken between the crosshairs on the telescope and the pattern centerline. Steps 86, 88 and 90 are repeated for each projector 28–39 to adjust images A–L projected to screen 40.

In steps 92–94, vertical and horizontal keystone distortion for projectors 28–39 is determined and corrected. Keystoning may occur in either the vertical or y direction, the horizontal or x direction, or both. Such distortion results in blooming, or enlarged areas, where the optical axis of a projector is not aligned perpendicular to the screen 40 and the image area is not centered about the center point of the image as displayed on screen 40. In step 92, the difference in length 45 of each image is determined for vertical keystone at the top and bottom edges of an image area, from the center of the left pixel to the center of the right pixel. Similarly, to determine horizontal keystone, the difference in height 41 of the image area at both the left and right edges of the image is measured from the center of the top pixel to the center of the bottom pixel. Should the difference be within an acceptable tolerance, e.g., a predetermined threshold such as one-third pixel, at step 93, no further adjustment of the measured dimension is required.

Should adjustment be required, the image area is adjusted and recentered in step 94 by rotation of the projector. For horizontal keystone, a projector is rotated about its vertical axis, and for vertical keystone, a projector is rotated about its lateral axis. Rotating each projector may be accomplished, for example, by adjusting rails 52 for each projector. After recentering the image in step 94, steps 92–94 are repeated until the difference values are within tolerance.

Fine alignment begins at step 100 where a nearly exact x-y position is established for a reference image area, by centering the alignment pattern 200 on reference lines 48 and 49. Typically, the reference image area is centrally located; for example, the reference is image E, see FIG. 2. In step 101, the nearest vertical and horizontal image neighbors F, C, and G are registered to image E. Thus, image F is registered to image E by first displaying the alignment pattern illustrated in FIG. 6 for projectors 32 and 33 corresponding to images E and F. Image F is moved laterally or in the x direction to establish a position of or register its image with image E. Image F is then moved in the vertical or y direction to bring the top middle pixel within a tolerance, such as one-quarter pixel, of the corresponding pixel on image E. Images C and G are similarly aligned to image E at the right and left middle pixels, respectively.

In step 102, the remaining image neighbors are registered to a nearest vertical and horizontal image neighbor. Thus, image D is registered to both image C and to image F. Step 103 then returns the process to repeat step 102 for each of the remaining images A, B, and H–L until images A–L are each registered adjacent to the image neighbors. Such registration as performed in steps 100–103 must also accommodate any lens imperfections, such as those discussed in further detail in conjunction with FIG. 4.

Figure 4:
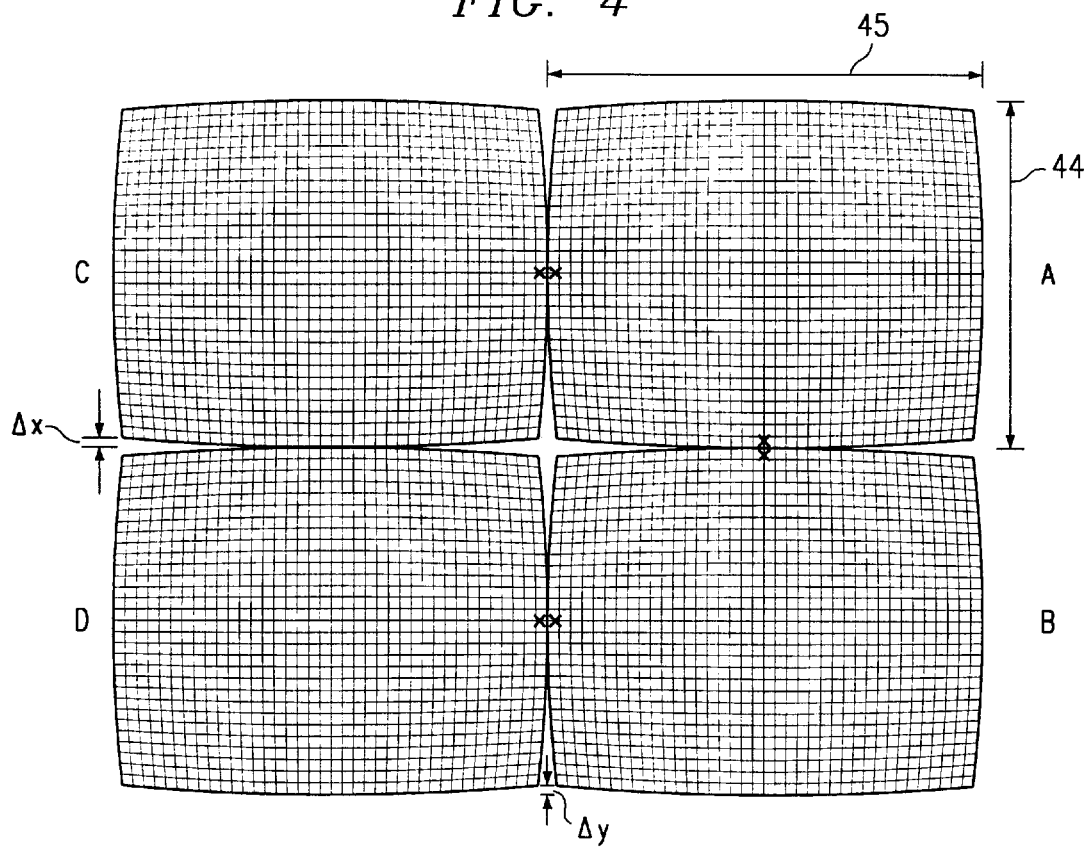
FIG. 4 is a diagram illustrating typical optical distortion corrected by proper image placement in a focal plane.

FIG. 4 is a diagram illustrating typical optical distortion corrected by proper image placement in a focal plane according to the teachings of the present invention. To achieve near seamless projection in system 10, any residual "barrel" distortion shown in FIG. 4 caused by imprecise manufacturing in a projection lens is to be removed, or accommodated. True seamless adjacency requires images A, B, C, and D to be seamlessly adjacent along substantially the entirety of the image areas of neighboring images, not merely near the center of each length 45 and height 44.

Seamless projection also involves matching the scale of adjacent projectors, so that corresponding pixels in the first and last rows of each adjacent image are also aligned. Typically, such alignment includes removing optical effects of each of the projectors, such as residual barrel distortion and keystoning. A method for such alignment was discussed in detail in conjunction with FIG. 3.

During adjustment of each relatively aligned projector, barrel distortion due to lens imperfections causes typical separations as shown in FIG. 4 in height 44 of delta y equal to about one pixel. Similarly, separation between laterally adjacent images A and C, or delta x, is typically 1–2 pixels. Such separation or gaps are to be accommodated in the alignment procedure. For example, one such approach for accommodating such gaps is to overlap neighboring images (e.g., A & B, and A & C) at their midpoints (denoted by x's). Overlapping should be maintained so that each corner of each image becomes near seamlessly adjacent to the corners of neighboring images within an acceptable tolerance. If lens imperfections result in, e.g., a 1.6 pixel gap for delta x, then an appropriate overlap is 1.35 pixels, in order to reduce delta x to 0.25 pixel. An overlap of this order is then accommodated in the method discussed in FIG. 3 during alignment.

FIG. 5 is a schematic diagram of an embodiment for alignment controls used according to the teachings of the present invention. Each projector is aligned using translator 70. Translator 70 moves in three dimensions, x, y, and z, and may be any standard translator that improves alignment for each lens within a projector. One such standard translator, Newport Corporation's 462-XYZ, is a three-axis micrometer positioning and alignment device for focus (z) and lateral and vertical (e.g., x-y) adjustment. Typically, alignment of each image A–L at distance 55 from screen 40 requires that each lens for projectors 28–39 be aligned within an acceptable tolerance. For example, alignment of images A–L to within a quarter pixel accuracy at distance 55 optically and geometrically requires that each lens be focused within a 10 micrometer accuracy.

FIG. 6 is an alignment pattern for an image visualization system using the teachings of the present invention. FIG. 6 comprises a matrix of image blocks 200 that are sized to cover an entire image of dimension length 45 and height 44. Length 45 comprises 1280 pixels and height 44 comprises 1024 pixels. Thus, each image block 200 comprises a symmetric 128 pixel square.

Image block 200 is particularly advantageous for performing alignment measurements in order to achieve relative alignment of each projector with respect to screen 40, as was described in conjunction with FIG. 3. Such relative alignment accounts for imperfections in each projector, to maintain geometric and optical placement of each pixel for each image. The center 220 of image block 200 comprises four pixels as shown in FIG. 6. Image block 200 also comprises an inner and outer border 235, 225 that are 124 and 128 pixels, respectively, in length as shown in FIG. 6.

It is also within the scope of the invention for screen 40 to have a generally curved shape. To seamlessly align images A–L on a curved screen 40, it is necessary to align and maintain the optical axis for each projector to both the center for its corresponding image, as well as perpendicular to an image center on screen 40. Such optical and geometric placement for projectors 28–39 with respect to screen 40 enables subsequent optical and geometrical alignment of images A–L as discussed above.

Figure 7:
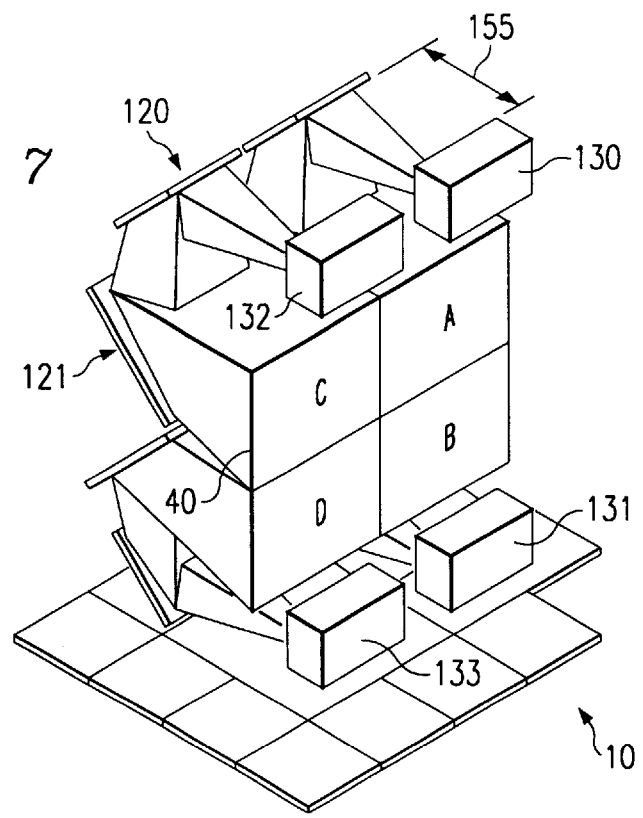
FIG. 7 is a schematic diagram of another embodiment of an image visualization system according to the present invention.

FIG. 7 is a schematic diagram of another embodiment of an image visualization system constructed according to the teachings of the present invention. System 10 comprises four projectors 130–133, two mirrors 120 and 121 for each projector, and screen 40.

This embodiment of system 10 uses suitable folded optics to project images A–D to screen 40. For each projector, two mirrors 120 and 121 are used to shorten the distance from each projector to screen 40. Algorithms for applying folded optics solutions to typical geometric configurations are known to those skilled in the art, and any suitable folded optics configuration may be used. Thus, for example, projectors 130–133 are located in FIG. 7 above and below screen 40, respectively, but may be located in other positions relative to screen 40 using other suitable folded optics configurations. Such a configuration reduces the volume needed for system 10 as well as easing performance of maintenance. It is particularly advantageous to use such a folded optics configuration for system 10 where users would prefer or may be limited to a smaller "footprint" for the system 10.

While the invention has been particularly shown and described by the foregoing detailed description, it will be understood by those skilled in the art that various other changes in form and detail may be made without departing from the spirit and scope of the invention.

What is claimed is:

1. A method for aligning an image visualization system to near seamless viewing, the system comprising a plurality of projectors mounted on racks and positioned from a viewing screen, comprising:

establishing an image position for an image projected for each of the plurality of projectors with reference to the viewing screen;

magnifying the image projected by each of the plurality of projectors to the viewing screen to fill the established image position to within substantially one pixel;

centering at a desired location within an established image position the image projected from each of the plurality of projectors to the viewing screen; and correcting horizontal and vertical keystoning effects for each image projected to the viewing screen from each of the plurality of projectors.

2. The method of claim 1 further comprising:

registering adjacent images projected by each of the plurality of projectors to one another to align edge pixels of adjacent images within a pixel distance of each other.

3. The method as set forth in claim 1 further comprising:

adjusting the viewing screen to be substantially perpendicular to the optical axis of each of the plurality of projectors.

4. The method of claim 1 further comprising:

adjusting the racks mounting the plurality of projectors to be substantially parallel to the viewing screen.

5. The method of claim 4 wherein adjusting the racks further comprises:

establishing the distance, tilt and parallelism of the racks with reference to the viewing screen.

6. The method of claim 1 further comprising:

establishing an alignment pattern to replicate an image pattern for each projector across a viewing screen.

7. The method of claim 1 wherein centering at a desired location further comprises:

translating a lens of each of the plurality of projectors in an x and y direction to align the centerline of an image projected by a projector with predetermined centering lines.

8. The method of claim 1 wherein magnifying the image projected by each of the plurality of projectors comprises:

adjusting the dimensions of the image projected from each of the plurality of projectors to cover the established image position.

9. The method as set forth in claim 1 wherein correcting vertical keystoning comprises:

rotating a projector about a lateral axis of the projector to within a predetermined difference in length of a projected image at the image top and image bottom.

10. The method of claim 9 wherein correcting horizontal keystoning comprises:

rotating a projector about a vertical axis of the projector to adjust the difference in height at both the left and right edges of a projected image to within a predetermined pixel alignment.

11. A method for aligning an image visualization system comprising a plurality of projectors mounted on racks and positioned from a viewing screen, comprising:

establishing an image position for an image projected from each of the plurality of projectors with reference to the viewing screen;

magnifying the image projected by each of the plurality of projectors to substantially cover an established image position for an image projected by each of the plurality of projectors;

establishing a reference image area for a selected image projected by one of the plurality of projectors by centering an alignment pattern on a reference axis; and registering the nearest vertical and horizontal images projected to the viewing screen to the reference image area.

12. The method of claim 11 further comprising:

registering each of the remaining images projected to the viewing screen to the nearest previously registered vertical and horizontal projected image.

13. The method of claim 11 wherein registering the nearest vertical and horizontal projected images comprises:

adjusting the projected image in the horizontal direction and the vertical direction to bring the projected image within an alignment tolerance with reference to an adjacent projected image.

14. The method of claim 11 further comprising:

correcting horizontal and vertical keystoning effects for each image projected by the plurality of projectors to the viewing screen to an established tolerance.

* * * * *

UNITED STATES PATENT AND TRADEMARK OFFICE
CERTIFICATE OF CORRECTION

PATENT NO.    : 6,254,239 B1
DATED         : July 3, 2001
INVENTOR(S)   : Rodney C. Hibner, II et al.

It is certified that error appears in the above-identified patent and that said Letters Patent is hereby corrected as shown below:

Title page,
Item [75], line 4, after "Hibner, II,", delete "Collin", and insert -- Allen --.
Line 5, after "Gangstead,", delete "Dallas", and insert -- Garland --.

Column 3,
Line 20, after the first "by", delete "resealing", and insert -- rescaling --.

Column 5,
Line 11, after "(not explicitly shown)", insert -- . --.

Signed and Sealed this

Twenty-fifth Day of December, 2001

Attest:

*Attesting Officer*

JAMES E. ROGAN
*Director of the United States Patent and Trademark Office*